A. LOOMIS.
COMBINED FRICTION AND POSITIVE CLUTCH.
APPLICATION FILED NOV. 10, 1906.

952,535.

Patented Mar. 22, 1910.

3 SHEETS—SHEET 1.

A. LOOMIS.
COMBINED FRICTION AND POSITIVE CLUTCH.
APPLICATION FILED NOV. 10, 1906.

952,535.

Patented Mar. 22, 1910.
3 SHEETS—SHEET 2.

Witnesses
J. G. Stinkel
J. J. McCarthy

Inventor
by Allen Loomis
Foster Freeman and Watson
Attorneys

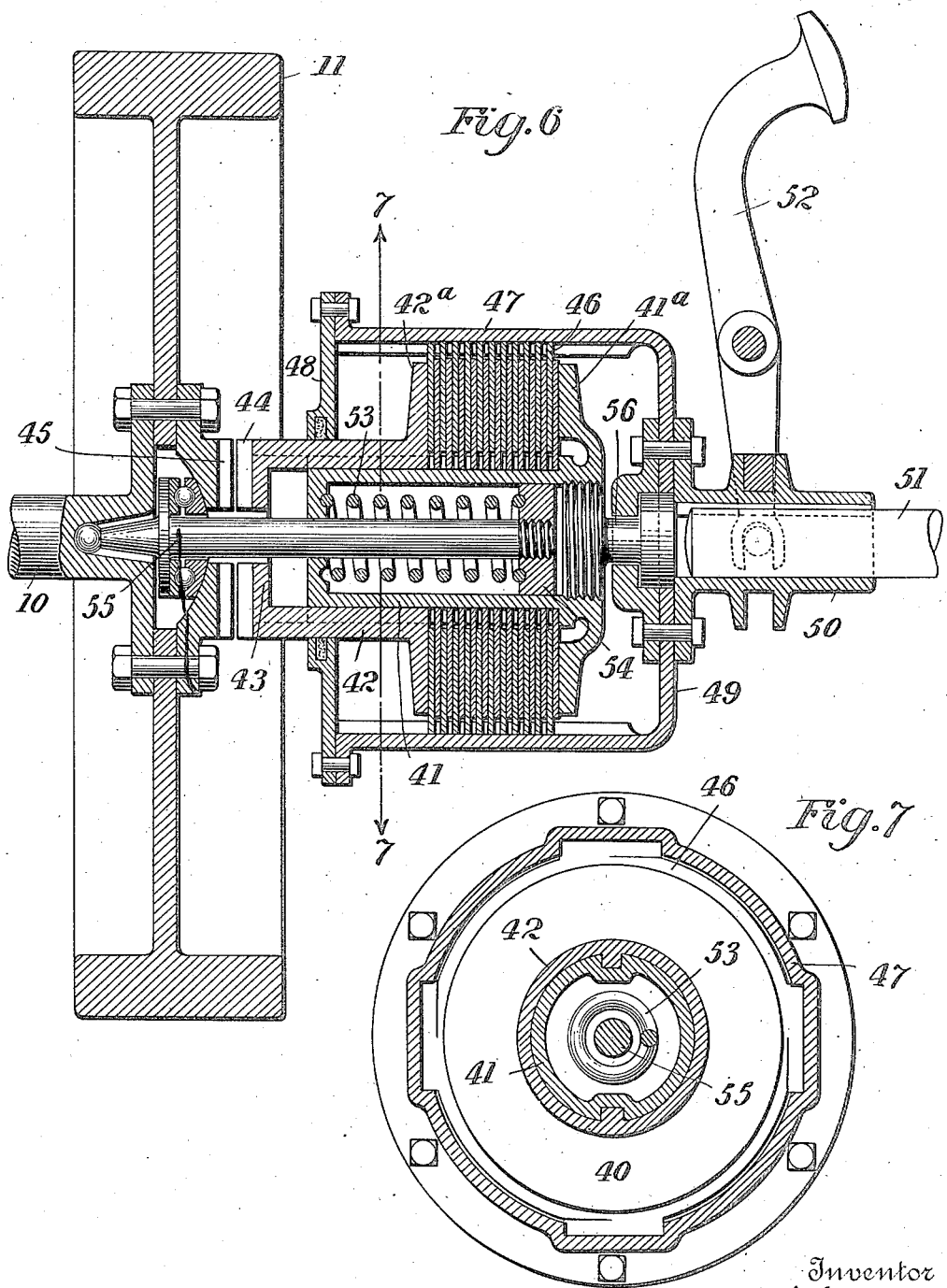

UNITED STATES PATENT OFFICE.

ALLEN LOOMIS, OF DETROIT, MICHIGAN, ASSIGNOR, BY MESNE ASSIGNMENTS, TO PACKARD MOTOR CAR COMPANY, OF DETROIT, MICHIGAN, A CORPORATION OF MICHIGAN.

COMBINED FRICTION AND POSITIVE CLUTCH.

952,535. Specification of Letters Patent. Patented Mar. 22, 1910.

Application filed November 10, 1906. Serial No. 342,885.

*To all whom it may concern:*

Be it known that I, ALLEN LOOMIS, a citizen of the United States, and residing at Detroit, Wayne county, State of Michigan, have invented certain new and useful Improvements in Combined Friction and Positive Clutches, of which the following is a specification.

This invention relates to improvements in clutches and particularly to a clutch which is specially adapted for connecting and disconnecting the driving wheels of a motor vehicle with the motor.

One of the features of the invention especially applicable to motor vehicles comprises means for instantly disconnecting a clutch of the multiple disk friction type, thus avoiding the usual drag due to the comparatively slow disengagement of the friction members in clutches of this type now in use.

Figure 1:
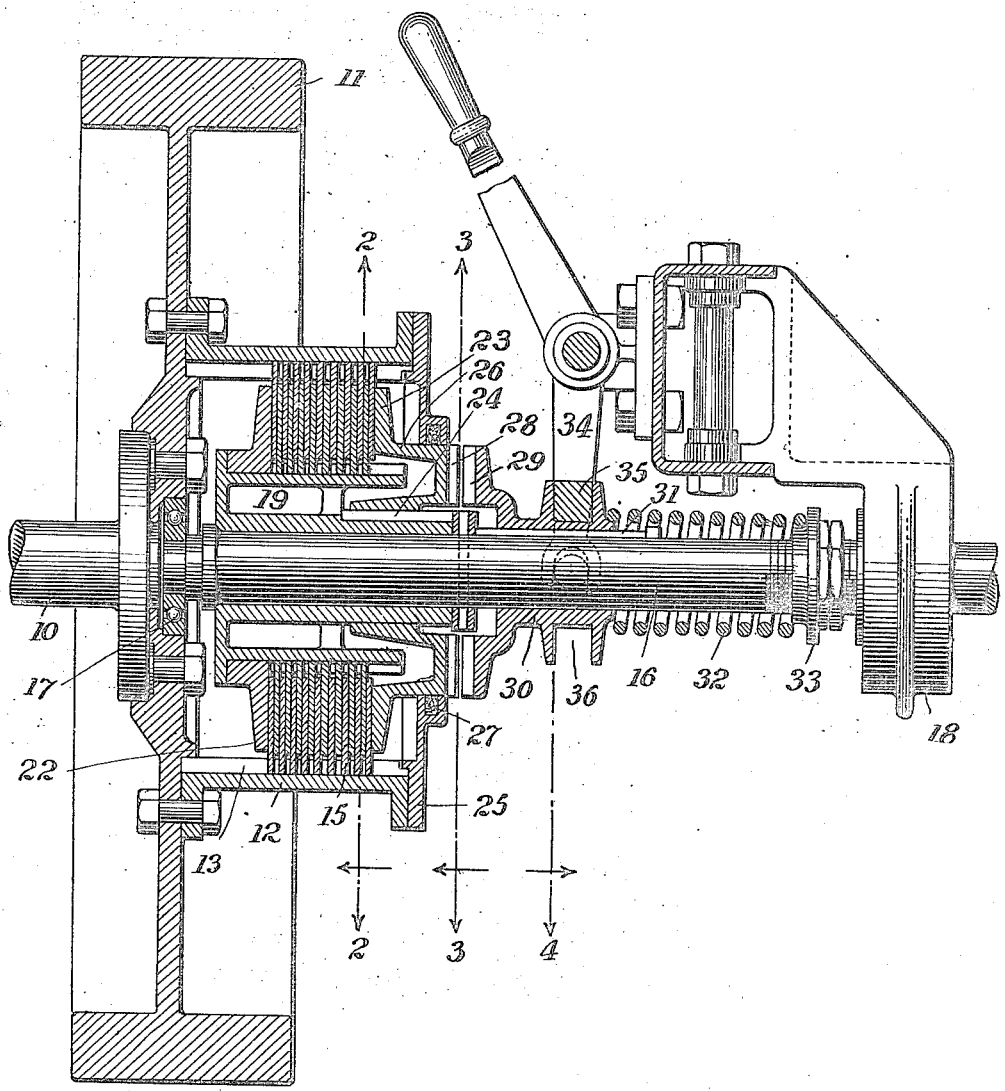
Figure 2:
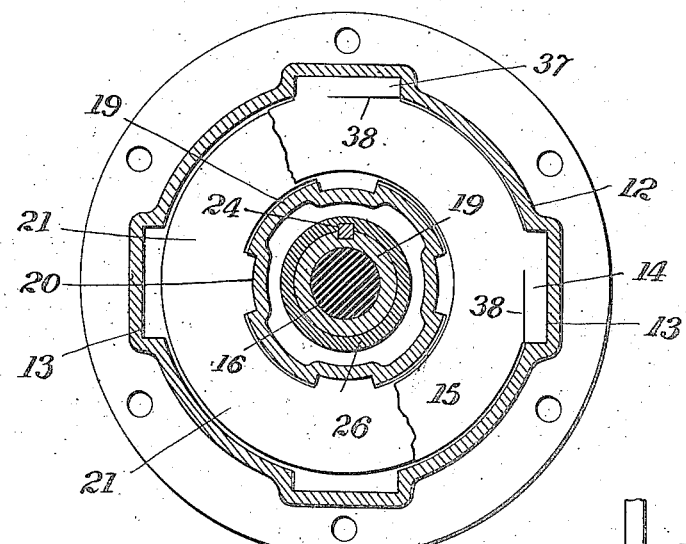
Figure 3:
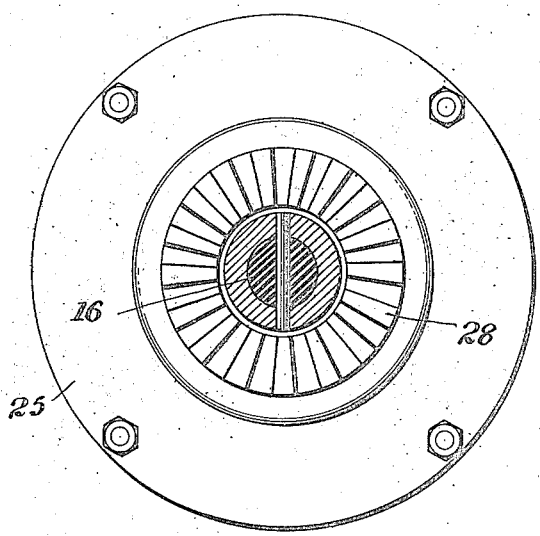
Figure 4:
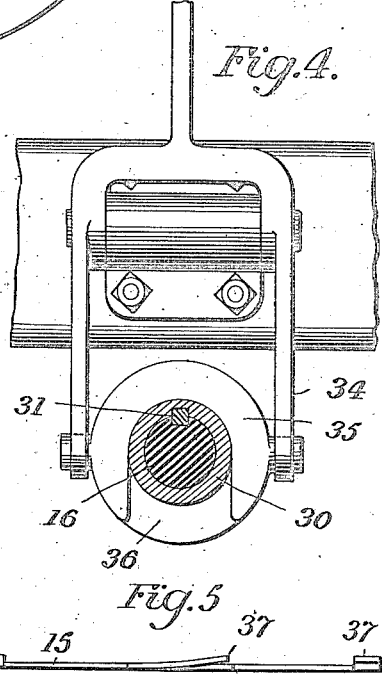
Figure 5:
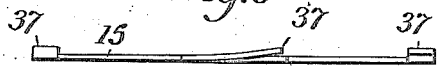

The invention will be described in connection with the accompanying drawings, in which:

Figure 1 is a central sectional view through a clutch embodying my invention; Fig. 2 is a section on the line 2 of Fig. 1; Fig. 3 is a section on the line 3 of Fig. 1; Fig. 4 is a section on the line 4 of Fig. 1; Fig. 5 is an edge view of one of the primary friction disks; Fig. 6 is a central sectional view through another form of clutch embodying my invention; and Fig. 7 is a section on the line 7 of Fig. 6.

Referring to the drawing, 10 indicates a driving shaft, which may be the crank shaft of a hydrocarbon engine, 11 indicates a fly-wheel rigidly connected to the shaft, and 12 a substantially cylindrical clutch casing rigidly connected with the fly-wheel. The clutch casing 12 has a series of internal recesses or grooves 13, which receive the ears 14 of a series of primary clutch disks 15, as shown in Figs. 1, 2 and 5. Coaxial with the driving shaft 10, is a driven shaft 16, one end of which has a bearing 17 in the fly-wheel. The said shaft is also supported near the clutch by a bearing 18, these bearings being of any suitable design.

Loose upon the driven shaft 16 and within the clutch casing, is a hub 19 having an outer substantially cylindrical surface provided with longitudinal grooves 20 adapted to receive lugs on a series of secondary clutch disks 21, the said disks being circular at their outer edges. The disks 15 and 21 are concentric and arranged alternately as shown in Fig. 1, and when pressed together the outer disks, which are driven by the clutch casing, turn the inner disks and the hub 19. The clutch disks are sustained at one side by a ring 22 on the hub 19 and at the other side they are sustained by a clutch ring 23, which is adapted to slide longitudinally upon an inner portion of the hub 19 and connected with the hub so as to turn therewith by means of one or more keys 24. Rigidly connected with the end of the clutch casing opposite to the fly-wheel, is a cover plate 25, which has a central circular opening fitting a cylindrical surface 26 on the clutch ring 23. The joint between this cover and the ring is preferably packed by a ring of felt or other fabric 27 arranged in a groove in the inner edge of the cover. The cover 25 serves to close the clutch casing and prevent the escape of oil with which the casing is preferably filled.

The outer face of the clutch ring 23 has a series of teeth or projections 28, which are adapted to engage a similar series of projections or teeth 29 upon a clutch sleeve 30, which is keyed to the shaft 16 by one or more keys 31 and adapted to slide on said shaft. A spring 32 surrounding the shaft 16 and interposed between a fixed collar 33 on said shaft and the clutch sleeve 30 tends to hold the clutch members 28 and 29 in engagement and to force the clutch ring 23 against the disks and clamp the primary and secondary disks together. The spring 32 has sufficient power to clamp the clutch disks together so tightly that they will form practically a positive clutch. The clutch sleeve 30 as shown, is operated by a lever 34 fulcrumed on a fixed part of the frame, one arm of said lever engaging a yoke 35 which runs in an annular groove 36 in the clutch sleeve 30. The lever 34 is preferably operated by a pedal when the clutch is used for transmitting power in a motor vehicle.

When the parts of the clutch are in the position shown in Fig. 1, the motor shaft 10 is entirely free from the driven shaft 16 and the motor may continue to run without turning the driven shaft. In this position of the parts, the spring 32 is compressed by the power applied to the lever 34. To start the machine, the lever 34 is released, permitting the spring 32 to first move the positive clutch member 29 into engagement with the clutch member 28 and then press the ring 23 against the clutch disks in the casing 12. These disks are thus clamped between the ring 23 and the ring 22, and the inner or secondary clutch disks gradually acquire the speed of the primary clutch disks, after which all of the parts run together and the shaft 16 is driven at the same speed as the motor shaft 10.

My invention is especially valuable for instantly disconnecting the driven shaft from the engine as is desirable in stopping an automobile, especially in making emergency stops. Thus while pressing the lever 34 forward, the positive clutch members 28 and 29 can be instantly disconnected, thereby disconnecting the driven shaft 16 from the motor shaft. Thereafter the clutch disks gradually separate, being assisted in separating by springs interposed between the lugs of the disks. These springs may be integral with the lugs and form part of the same, as shown in Figs. 2 and 5, in which 37 indicates spring tongues which are formed by slitting the lugs along the lines 38 and bending the tongues outward. In friction clutches of the class shown, the friction disks or plates are held together by suction after being released from positive pressure and it is impossible to stop the machine quickly if the friction clutch alone be relied on. By combining, however, the positive clutch with the friction clutch, I am enabled to start the machine without a jar and to stop it in the same manner and I am also enabled to disconnect the driven shaft instantly from the motor if it is desirable to make a quick stop. As it is frequently of vital importance to stop suddenly to prevent accident, the importance of this improvement will be appreciated.

It will be noted that the clutch ring 23 is connected to rotate with the inner or driven member of the friction clutch. When the positive clutch 28, 29 is disconnected as shown in Fig. 1, both members of the friction clutch may rotate freely while the driven shaft 16 is stationary. On throwing in the positive clutch, the inner friction clutch member will be momentarily stopped, but as the spring 32 is allowed to expand, the primary and secondary clutch disks will be gradually clamped together and the inner clutch member gradually started, carrying with it the driven shaft. As the full force of the spring 32 is applied the friction clutch members will be gripped so tightly that they will turn together and all of the parts connected with the driving and driven shafts will rotate as a unit.

The modified form of the invention illustrated in Fig. 6 is in the nature of a reversal of a number of the parts shown in Fig. 1. Referring to Figs. 6 and 7, the primary elements 40 of the friction clutch are mounted on a cylinder 41 which carries one of the annular clamping jaws 41ª. The other clamping jaw 42ª is carried by a second cylinder 42 which is adapted to slide on and turn with the cylinder 41. The cylinder 42 is provided on its end 43 with a series of jaws or teeth 44 which are adapted to interlock with a similar series of jaws or teeth 45, carried by the fly wheel 11, forming therewith a positive clutch. The secondary elements 46 of the friction clutch are arranged alternately with the primary elements and are connected with a cylindrical casing 47 which incloses both sets of friction disks. At one end the casing 47 has a flange 48 which fits the periphery of the cylinder 42, and at its other end the casing 47 has a flange 49 which is rigidly connected to the sleeve or collar 50 which is adapted to slide on and turn with the driven shaft 51. The sleeve or collar 50 and the parts connected thereto may be shifted longitudinally of the shaft by any suitable means, such as a foot-lever or pedal 52. As shown, the members of the positive clutch 44, 45, are normally engaged and the elements of the friction clutch are normally clamped together by a spring 53 which is interposed between the head of the cylinder 41 and an abutment 54 which is connected with the driving shaft 10. As shown, the rod 55 is suitably tied to the driving shaft, with freedom to turn relatively thereto, and the abutment 54 is connected to said rod. The spring presses the jaw 41ª against the friction elements and moves them bodily to the left, as shown in Fig. 6, carrying the opposing jaw 42ª to the left until the clutch teeth 44, 45, are engaged. The jaw 42ª then becomes fixed and the spring 53, still pressing against the jaw 41ª, clamps the friction disks securely together, causing the entire clutch to run as one piece. To open the clutches, the jaw 41ª and casing 47 are simultaneously pulled to the right. The casing is rigidly connected with the sleeve 50 and the jaw 41ª is also connected to said sleeve by means of a rod 56, one end of which is rigidly connected with the jaw 41 and the other end of which is swiveled to the casing 47 and sleeve 50, as clearly shown in the drawing. The operation of this modified clutch is as follows: As shown in the drawing the spring 53 is compressed by means of the lever 52 sufficiently to disconnect the positive clutch members 44, 45. When these members are disconnected, the jaw 42ª of the friction clutch is not under the influence of force to move it in either direction and hence the elements of the friction clutch are free to move relatively. When the lever 52 is released the casing 47, the jaws 41ª, 42ª, and their connected parts move bodily to the left until the positive clutch members 44, 45, are interlocked. Further movement to the left is therefore prevented and the spring next takes effect upon the friction clutch, clamping the plates or elements securely together. On moving the lever 52 in reverse direction, the positive clutch is instantly disengaged and both members of the friction clutch are thus permitted to stop quickly.

Having described my invention what I claim and desire to secure by Letters Patent is, 1. In a clutch mechanism, the combination with a driving shaft, a clutch casing connected with said shaft, and primary clutch disks connected with said casing, of the driven shaft concentrically arranged within said casing, a clutch disk hub mounted with freedom to turn on said shaft within the casing, the secondary disks mounted on said hub, the clutch ring arranged to slide on and turn with said hub and adapted to bear on the clutch disks, a positive clutch member on said clutch ring, and a positive clutch member on said driven shaft and adapted to engage with the clutch member on the ring, for the purpose set forth.

2. In a clutch mechanism, the combination with a driving shaft and a driven shaft, of a friction clutch comprising two series of interleaved friction disks, a member on the driving shaft interlocked with one series of said disks, two members rotatably mounted on the driven shaft and forming clamping jaws for said friction disks, one of said members being interlocked with a series of said disks, and means for positively connecting said latter member to said driven shaft.

3. In a clutch mechanism the combination with a driving shaft and a driven shaft, of a cylindrical casing connected with the driving shaft, two series of interleaved disks within said casing, one of said series being interlocked with the casing, a hub loosely mounted on the driven shaft and interlocked with the other series of said disks, a member sliding on said hub and adapted to close the casing, and means for connecting and disconnecting said hub and the driven shaft.

4. In a clutch mechanism, the combination with a driving shaft and a driven shaft, of a cylindrical casing connected to one of said shafts, a hub loosely mounted upon the other shaft, two series of interleaved friction disks, one series being interlocked with the casing and the other with the hub, a member sliding on said hub and adapted both to close the casing and to clamp the friction disks, and a clutch mounted on the driven shaft and adapted to engage said member.

In testimony whereof I affix my signature in presence of two witnesses.

ALLEN LOOMIS.

Witnesses:
  RUSSELL HUFF,
  R. H. ALLEN.